US006612333B2

(12) United States Patent
Miyazoe et al.

(10) Patent No.: US 6,612,333 B2
(45) Date of Patent: Sep. 2, 2003

(54) SELECTOR VALVE WITH MAGNETOMETRIC SENSOR

(75) Inventors: Shinji Miyazoe, Tsukuba-gun (JP); Makoto Ishikawa, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 57 days.

(21) Appl. No.: 09/961,370

(22) Filed: Sep. 25, 2001

(65) Prior Publication Data

US 2002/0040735 A1 Apr. 11, 2002

(30) Foreign Application Priority Data

Oct. 6, 2000 (JP) ....................................... 2000-307794

(51) Int. Cl.[7] ................................................ F16K 37/00
(52) U.S. Cl. ................... 137/554; 137/625.65; 137/884
(58) Field of Search ................................ 137/554, 884, 137/625.65

(56) References Cited

U.S. PATENT DOCUMENTS 3,896,280 A * 7/1975 Blake ......................... 137/554
4,406,303 A * 9/1983 Kilmoyer .................... 137/554
5,785,087 A * 7/1998 Takahashi et al. .......... 137/554
6,152,172 A * 11/2000 Christianson et al. ....... 137/554
6,164,323 A * 12/2000 Smith et al. ................ 137/554
6,199,585 B1 * 3/2001 Reith et al. ................. 137/554
6,220,284 B1 * 4/2001 Hayashi et al. ............. 137/554
6,263,915 B1 * 7/2001 Hayashi et al. ............. 137/554
6,267,140 B1 * 7/2001 Hayashi et al. ............. 137/554
6,283,149 B1 * 9/2001 Hayashi et al. ............. 137/554
6,427,720 B1 * 8/2002 Hayashi et al. ............. 137/554

FOREIGN PATENT DOCUMENTS

JP 2-66784 5/1990

* cited by examiner

*Primary Examiner*—John Rivell
(74) *Attorney, Agent, or Firm*—Oblon, Spivak, McClelland, Maier & Neustadt, P.C.

(57) ABSTRACT

By causing an end portion of a spool to extend outside from a valve hole, mounting a magnet to the extending portion, disposing a detecting block between a casing and an end block to surround the magnet, and mounting a magnetometric sensor to the detecting block, necessity for processing for mounting the electromagnetic sensor to the casing is avoided.

18 Claims, 4 Drawing Sheets

SELECTOR VALVE WITH MAGNETOMETRIC SENSOR

TECHNICAL FIELD TO WIHCH THE INVENTION BELONGS

The present invention relates to a selector valve with a magnetometric sensor for detecting an operating position of a spool by using a magnet and a magnetometric sensor.

PRIOR ART

There is a known selector valve with a magnetometric sensor in which switching operation of a spool can be detected by providing a magnet and the magnetometric sensor as disclosed in Japanese Utility Model Application Laid-open No. 2-66784, for example. This known selector valve is formed by mounting the magnet to an outer periphery of the spool and mounting the magnetometric sensor to a casing. When the spool moves to one switching position, the magnet approaches the magnetometric sensor and the magnetometric sensor is turned on. When the spool moves to the other switching position, the magnet is separated from the magnetometric sensor and the magnetometric sensor is turned off. Switching of the spool is detected by turning on and off of the magnetometric sensor.

However, because the magnet is mounted to a central portion of the spool sliding in a valve hole and the magnetometric sensor is mounted to a central portion of the casing corresponding to the magnet in the prior-art selector valve, special spool and casing with complicated structures different from those of a selector valve without a magnetometric sensor have to be used. Especially in a case of the casing, because a plurality of ports, a plurality of flow paths connecting the ports and the valve hole, or a plurality of pilot flow paths are normally formed in a complicated state, it is extremely difficult in terms of design to newly provide a mounting hole in which the magnetometric sensor is to be mounted, an introducing hole for wiring, and the like while preventing them from interfering with the ports and flow paths. Therefore, in order to simplify the structure, it is preferable to use as many parts as possible in common with the normal selector valve without the magnetometric sensor. It is especially desirable to use the common casing.

Furthermore, in order to precisely control operation of the selector valve and to predict a failure, it is preferable to detect not only if the spool has reached a stroke end but also every operating position of the spool by using the magnet and the magnetometric sensor.

DISCLOSURE OF THE INVENTION

It is a main technical object of the present invention to provide a selector valve with a magnetometric sensor, the selector valve being able to be formed easily by using a casing in common with a normal selector valve without a magnetometric sensor, a structure of the selector valve being simple, and the selector valve being able to be produced easily.

It is subsidiary another technical object of the invention to form the above-described selector valve with the magnetometric sensor such that an operating position of a spool can be detected throughout a stroke.

To achieve the above objects, a selector valve of the present invention comprises: a casing having a plurality of ports and a valve hole into which the ports open; a spool housed for sliding in the valve hole and having one end extending outside from the valve hole to switch flow paths; end blocks mounted to opposite sides of the casing; driving means for driving the spool; a magnet mounted to a portion of the one end of the spool extending from the valve hole so as to move with the spool outside the valve hole; a detecting block disposed between one end of the casing and one of the end blocks so as to surround the magnet mounted to the spool; and at least one magnetometric sensor mounted to the detecting block so as to be able to detect magnetism from the magnet.

According to the selector valve with the magnetometric sensor of the invention having the above structure, by disposing the detecting block between the casing and the end block, mounting the magnetometric sensor to the detecting block, causing the end portion of the spool to extend into the detecting block, and mounting the magnet to the extending portion, as compared with a normal selector valve without the magnetometric sensor, it is unnecessary to subject the casing having a complicated structure to any special processing and it is possible to easily form the selector valve with the magnetometric sensor by using the casing in common with the normal selector valve by only and newly preparing the detecting block and making few improvements to the spool.

According to a preferable concrete embodiment of the invention, the detecting block includes a first portion sandwiched between the casing and the end block to surround an area where the magnet moves and a second portion positioned along an outer face of the selector valve astride the first portion and the end block, a sensor mounting groove is formed in the second portion in parallel with an axis of the spool and astride the moving area of the magnet, and the magnetometric sensor is fitted in the sensor mounting groove.

In this case, it is preferable that the magnetometric sensor is mounted in the sensor mounting groove so as to be able to detect the magnetism from the magnet throughout a stroke of the spool and that every operating position of the spool can be detected from a change in magnetic flux density due to movement of the magnet.

As a result, because not only positions of the spool at the stroke ends but also a position at any midpoint of the stroke can be detected, it is possible to easily judge by a judging circuit if the spool has operated normally from a relationship between positions and operating time of the spool from start to finish of the stroke. Thus, it is possible to take preventive measures prior to a failure and to prevent suspension of operation of an operating system for many hours due to the failure and an accident.

According to another concrete embodiment of the invention, the driving means is a solenoid-operated pilot valve, the spool is switched by one or two pilot valve(s), every pilot valve is mounted to one of the end blocks, and the magnet and the magnetometric sensor are provided on a side of the end blocks to which the pilot valve(s) is(are) not mounted.

DETAILED DESCRIPTION

Figure 1:
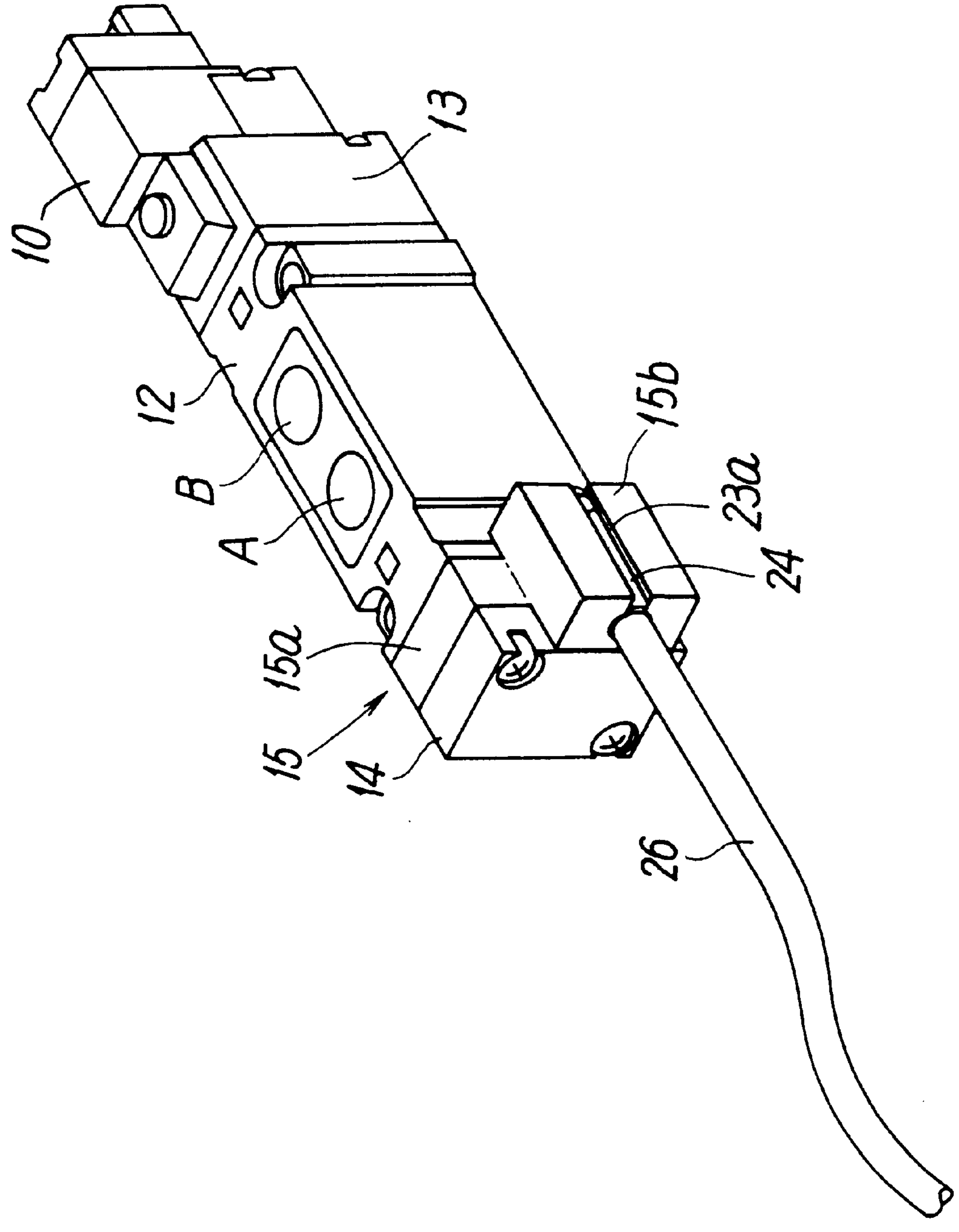
FIG. 1 is a perspective view of an embodiment of a selector valve according to the present invention.
Figure 2:
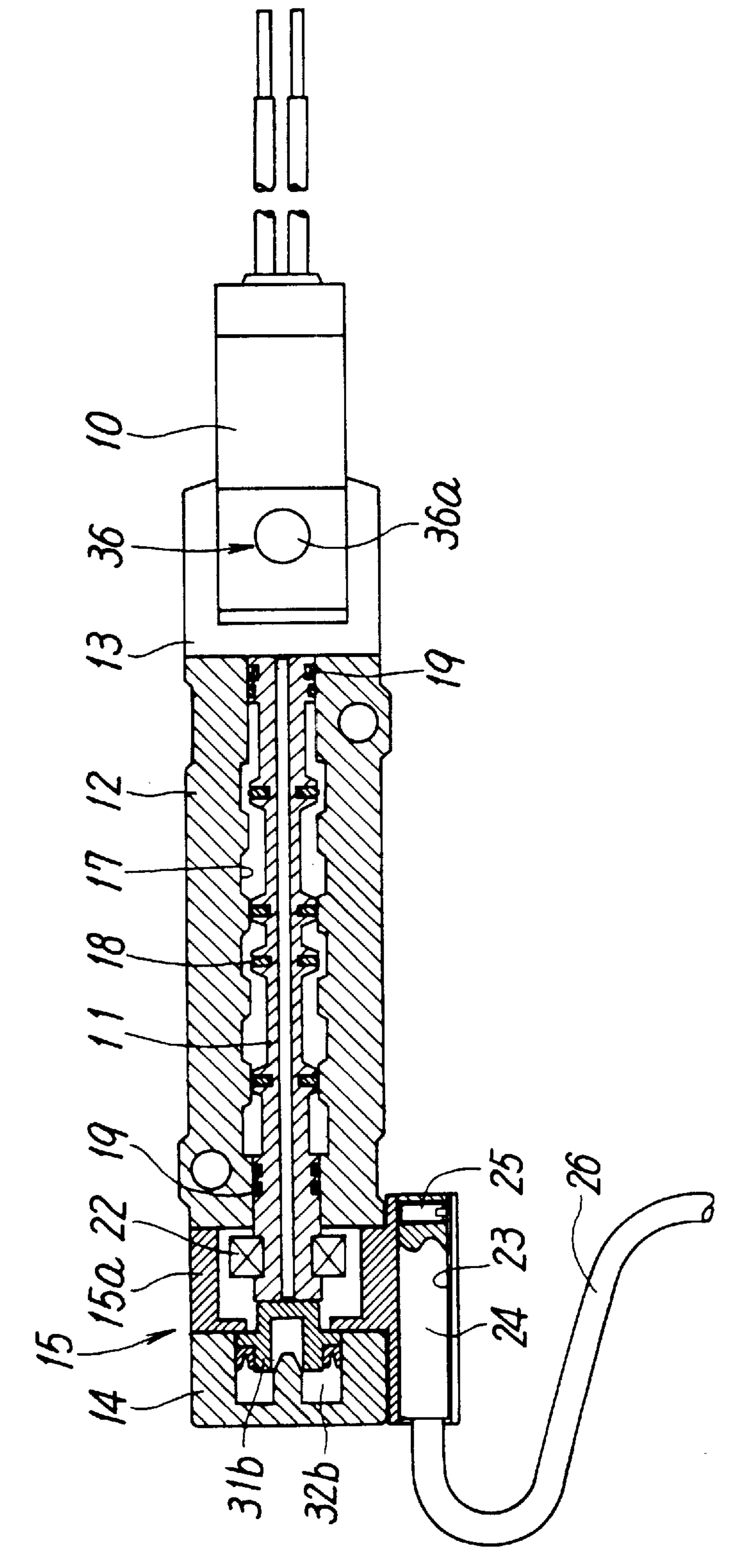
FIG. 2 is a cross-sectional plan view of a central portion of the selector valve in FIG. 1.

The drawings show a preferable embodiment of a selector valve with a magnetometric sensor according to the present invention. The selector valve shown here as an example is a single-pilot-type selector valve in which a spool 11 is switched by using one solenoid-operated pilot valve 10.

The selector valve includes a casing 12 made of non-magnetic material and substantially in a shape of a rectangular parallelepiped and end blocks 13 and 14 made of non-magnetic material, having rectangular sectional shapes, and mounted to axial opposite sides of the casing 12. The pilot valve 10 is mounted to the one, first end block 13 and a detecting block 15 made of non-magnetic material is disposed between the other, second end block 14 and the casing 12.

A supply port P and two discharge ports EA and EB are provided to one of upper and lower faces of the casing 12 and two output ports A and B are provided to the other face. A valve hole 17 into which the respective ports open side by side in an axial direction is provided in the casing 12. The spool 11 for switching flow paths and made of non-magnetic material is housed for sliding in its axial direction in the valve hole 17.

A plurality of sealing members 18 for connecting and separating flow paths connecting the respective ports to and from each other are provided to an outer periphery of the spool 11 and end portion sealing members 19 for separating breathing chambers 20*a* and 20*b* which respective end portions of the spool 11 face and the flow paths in the valve hole 7 from each other are provided respectively to outer peripheries of opposite end portions of the spool 11. One end of the spool 11 extends outside from the valve hole 17 and is positioned in the detecting block 15 and a magnet 22 is mounted to an outer periphery of the extending portion of the spool 11 so as to move with the spool 11 outside the valve hole 17.

This magnet 22 is formed by mixing metal powder having a magnetic property into a soft elastic base material such as synthetic resin and synthetic rubber in a ring shape having a notch at a portion of a circumference. The magnet 22 is mounted to the above position by fitting the magnet in a mounting groove formed in the outer periphery of the end portion of the spool 11 while elastically expanding a diameter of the magnet 22. It is also possible to fit two hard semicircular magnet pieces in the mounting groove such that the pieces are arranged in a ring shape.

The magnet 22 mounted to the spool 11 in the breathing chamber 20*a* outside the valve hole 17 is separated from working fluid. Therefore, if moisture, chemical mist, particles of magnetic material such as metal powder, and the like are included in the working fluid, the magnet 22 does not rust or corrode in contact with the moisture and chemical mist and does not adsorb the particles of magnetic material. As a result, reduction of accuracy of position detection due to reduction of a function of the magnet 22 and an inoperable state of the spool 11 due to the adsorbed minute particles do not occur.

On the other hand, the detecting block 15 includes a first portion 15*a* sandwiched between the casing 12 and the second end block 14 and having a rectangular sectional shape to surround an area where the magnet 22 moves and a second portion 15*b* positioned astride the first portion 15*a* and the second end block 14 along an outer face of the selector valve. A sensor mounting groove 23 having a groove inside wider than an opening portion 23*a* is formed in the second portion 15*b* astride the moving area of the magnet 22 in parallel with an axis of the spool 11 and the magnetometric sensor 24 is fitted in the sensor mounting groove 23. The first portion 15*a* and the second portion 15*b* may be formed integrally or may be formed separately and connected to each other.

The magnetometric sensor 24 is lifted toward the opening portion 23*a* and pressed against and fixed to an inner face of the opening portion 23*a* by screwing a setscrew 25 down into a screw hole formed in the magnetometric sensor 24 and fastening the setscrew 25 to bring a screw tip end into contact with a groove bottom of the mounting groove 23. In this manner, the magnetometric sensor 24 is mounted so as to be able to detect an operating position of the spool 11 throughout a stroke from a change in magnetic flux density due to movement of the magnet 22. In this case, if the operating position of the spool 11 throughout the stroke cannot be detected by using one magnetometric sensor, two magnetometric sensors may be mounted in positions displaced from each other in the sensor mounting groove 23. It is also possible to mount two magnetometric sensors having sensor functions in one sensor body.

The magnetometric sensor 24 is connected to a judging circuit of a controller (not shown) through a lead 26 and outputs a detection signal corresponding to magnetic flux density to this judging circuit. In this judging circuit, data necessary for position detection such as respective interrelationships between each operating position and magnetic flux density, operating time, and fluid pressure when the spool 11 operates normally is input in advance. If the detection signal from the magnetometric sensor 24 is input, positions of opposite stroke ends and respective positions in the stroke of the spool 11 are measured based on the data and used for control. From a relationship between the positions and the operating time of the spool 11 from start to finish of the stroke, it can also be possible to judge if the operation of the spool 11 is normal. Thus, it is possible to detect a sign of a failure in advance and to take preventive measures. As a result, it is possible to prevent suspension of operation of the device for many hours due to generation of the failure, an accident, and the like.

Piston chambers 30*a*, 30*b* are formed respectively in the first end block 13 and the second end block 14. The first piston chamber 30*a* formed in the first end block 13 has a large diameter and a large-diameter first piston 31*a* is housed for sliding in the first piston chamber 30*a*. The second piston chamber 30*b* formed in the second end block 14 has a smaller diameter and a small-diameter second piston 31*b* is housed for sliding in the second piston chamber 30*b*. These pistons 31*a* and 31*b* are respectively in contact with end faces of the spool 11. A first pressure chamber 32*a* and a second pressure chamber 32*b* are respectively formed on back face sides of the respective pistons 31*a* and 31*b*, i.e., on opposite sides to the faces in contact with the spool 11. Between the respective pistons 31*a*, 31*b* and the end faces of the spool 11, breathing chambers 20*a* and 20*b* opening to an outside are formed respectively. The pressure chambers 32*a* and 32*b* are airtightly separated from the breathing chambers 20*a* and 20*b* with piston packing 33 mounted to outer peripheries of the pistons 31*a* and 31*b*.

The first pressure chamber 32*a* on a side of the large-diameter first piston chamber 30*a* communicates with the supply port P through a pilot flow path 35 extending in the casing 12 and the first end block 13 through the pilot valve 10 and a manual operation mechanism 36. The second pressure chamber 32*b* on a side of the small-diameter second piston 31*b* constantly communicates with the supply port P through a pilot flow path 37 extending from the casing 12 in the detecting block 15 and the second end block 14.

Figure 3:
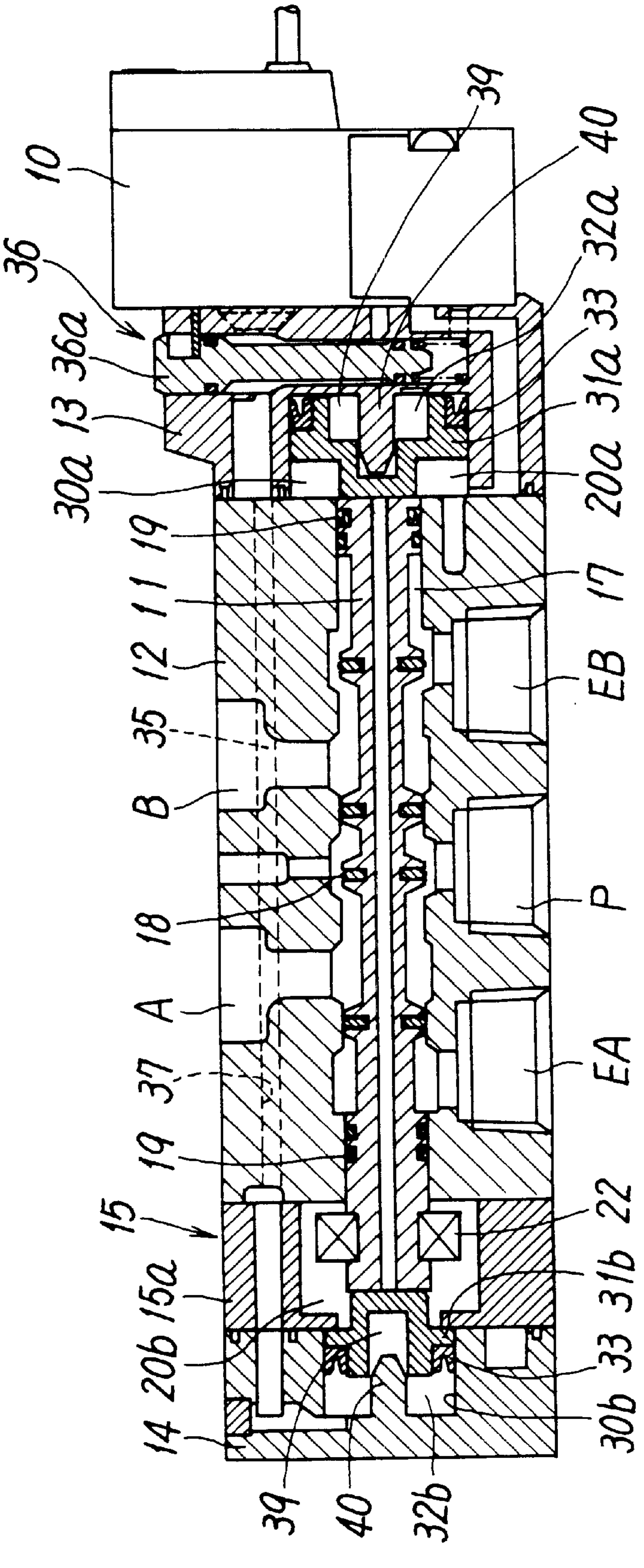
FIG. 3 is a vertical sectional side view of the central portion of the selector valve in FIG. 1.
Figure 4:
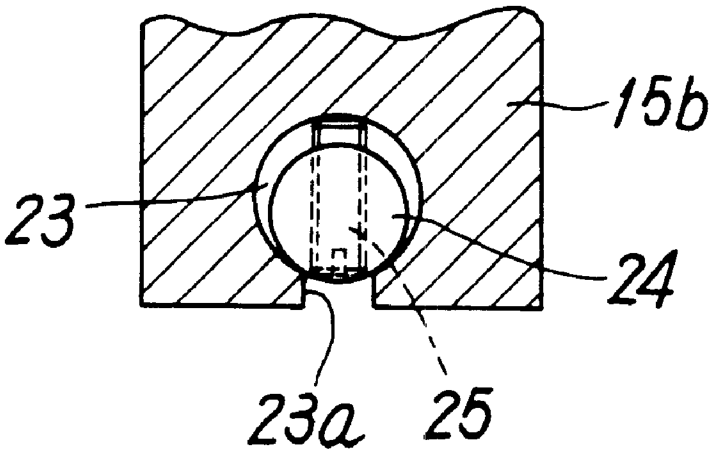
FIG. 4 is an enlarged sectional view of an essential portion of FIG. 2.

In FIG. 3, reference numerals 39 designates guide holes formed in the axial direction in central portions of pressure receiving faces of the respective pistons 31*a* and 31*b* and reference numerals 40 designate guides projecting from chamber walls of the pressure chambers 32*a* and 32*b* in the respective end blocks 13 and 14 to be fitted in the guide holes 39 for guiding the pistons 31*a* and 31*b* such that the pistons 31*a* and 31*b* operate stably.

When the pilot valve 10 is in an off state and pilot fluid is not supplied to the first pressure chamber 32*a*, the second piston 31*b* is pushed with pilot fluid pressure supplied to the second pressure chamber 32*b*. Therefore, the spool 11 is in a first switching position which is displaced rightward as shown in FIG. 3. If the pilot valve 10 is switched to an on state and the pilot fluid is supplied to the first pressure chamber 32*a* from this state, because a fluid pressure operating force acting on the first piston chamber 30*a* is larger than that acting on the second piston 31*b* due to a difference between pressure receiving areas of the two pistons 31*a* and 31*b*, the spool 11 is pushed with the first piston chamber 30*a* and moves leftward to occupy a second switching position.

A switching operation of the spool 11 is detected throughout the stroke by detecting magnetic flux of the magnet 22 moving with the spool 11 by using the magnetometric sensor 24. The detection signal is input to the judging circuit and used for control of the selector valve and other associated devices and prediction of the failure of the selector valve.

The manual operation mechanism 36 is for directly connecting the pilot flow path and the first pressure chamber 32*a* by pushing down an operation member 36*a*. A switching state similar to the case in which the pilot valve 10 is turned on is obtained manually.

The pilot valve 10 is the solenoid-operated pilot valve for opening and closing the pilot flow path by energization of a solenoid. Because a structure and operation of the pilot valve 10 are similar to those of known pilot valves, concrete descriptions of them will be omitted.

As described above, by disposing the detecting block 15 between the casing 12 and the end block 14, mounting the magnetometric sensor 24 to the detecting block 15, causing the end portion of the spool 11 to extend into the detecting block 15, and mounting the magnet 22 to the extending position, as compared with a normal selector valve without the magnetometric sensor 24, it is unnecessary to subject the casing 12 having a complicated structure to any special processing and it is possible to easily form the selector valve with the magnetometric sensor by using the casing 12 in common with the normal selector valve by only and newly preparing the detecting block 15 and making few improvements to the spool 11.

Although the second portion 15*b* of the detecting block 15 is provided to the side face of the selector valve in the above embodiment, the second portion 15*b* may be disposed on an upper face or a lower face of the selector valve.

Although the detecting block 15, the magnet 22, and the magnetometric sensor 24 are provided on a side of the second end block 14 where the pilot valve 10 is not mounted, they may be provided on a side of the first end block 13 where the pilot valve 10 is mounted.

The type of the selector valve is not limited to the single-pilot type as described in the embodiment but may be a double-pilot-type selector valve having two pilot valves 10 or may be a direct-acting selector valve in which the spool 11 is directly driven by electromagnetic or mechanical driving means.

If the selector valve is a three-position selector valve having three switching positions, the magnet and the magnetometric sensor are preferably disposed such that all the three switching positions can be detected.

As described above in detail, the selector valve with the magnetometric sensor of the invention can be formed easily by using the casing in common with the normal selector valve without the magnetometric sensor, the structure of the selector valve of the invention is simple, and the selector valve can be produced easily.

What is claimed is:

1. A selector valve with a magnetometric sensor, said selector valve comprising:

- a casing having a plurality of ports and a valve hole into which said ports open;
- a spool housed for sliding in said valve hole and having one end extending outside from said valve hole to switch flow paths;
- end blocks configured to house a piston on opposite sides of said casing;
- driving means for driving said spool;
- a magnet mounted to a portion of said one end of said spool extending from said valve hole so as to move with said spool outside said valve hole;
- a detecting block disposed between one end of said casing and one of said end blocks to surround the one end of the spool extending from the valve hole and the magnet mounted to the portion of the one end of the spool extending from the valve hole; and
- at least one magnetometric sensor mounted to said detecting block so as to be able to detect magnetism from said magnet.

2. A selector valve according to claim 1, wherein said detecting block includes a first portion sandwiched between said casing and said end block to surround an area where said magnet moves and a second portion positioned along an outer face of said selector valve astride said first portion and said end block, a sensor mounting groove is formed in said second portion in parallel with an axis of said spool and astride said moving area of said magnet, and said magnetometric sensor is fitted in said sensor mounting groove.

3. A selector valve according to claim 2, wherein said magnetometric sensor is mounted in said sensor mounting groove so as to be able to detect said magnetism from said magnet throughout a stroke of said spool and every operating position of said spool can be detected from a change in magnetic flux density due to movement of said magnet.

4. A selector valve according to claim 1, wherein said driving means is a solenoid-operated pilot valve, said spool is switched by one or two pilot valve(s), every pilot valve is mounted to one of said end blocks, and said magnet and said magnetometric sensor are provided on a side of said end blocks to which said pilot valve(s) is(are) not mounted.

5. A selector valve according to claim 2, wherein said driving means is a solenoid-operated pilot valve, said spool is switched by one or two pilot valve(s), every pilot valve is mounted to one of said end blocks, and said magnet and said magnetometric sensor are provided on a side of said end plate to which said pilot valve(s) is(are) not mounted.

6. A selector valve according to claim 1, wherein the driving means is a solenoid-operated pilot valve, the spool is switched by one or two pilot valve(s), every pilot valve is mounted to one of the end blocks, and the magnet and the magnetometric sensor are provided on a side of the end blocks to which the pilot valve(s) is(are) not mounted.

7. A selector valve according to claim 2, wherein the driving means is a solenoid-operated pilot valve, the spool is switched by a pilot valve, the pilot valve is mounted to one of the end blocks, and the magnet and the magnetometric sensor are provided on a side of the end plate to which the pilot valve is not mounted.

8. A selector valve with a magnetometric sensor, the selector valve comprising:

a casing having a plurality of ports and a valve hole into which the ports open;

a spool housed for sliding in the valve hole and having one end extending outside from the valve hole to switch flow paths;

end blocks on opposite sides of the casing;

driving means for driving the spool;

a magnet mounted to a portion of the one end of the spool extending from the valve hole so as to move with the spool outside the valve hole;

a detecting block disposed between one end of the casing and one of the end blocks so as to surround the magnet mounted to the spool; and at least one magnetometric sensor mounted to the detecting block so as to be able to detect magnetism from the magnet, wherein the detecting block includes a first portion sandwiched between the casing and the end block to surround an area where the magnet moves and a second portion positioned along an outer face of the selector valve astride the first portion and the end block, a sensor mounting groove is formed in the second portion in parallel with an axis of the spool and astride the moving area of the magnet, and the magnetometric sensor is fitted in the sensor mounting groove.

9. A selector valve according to claim 8, wherein the magnetometric sensor is mounted in the sensor mounting groove so as to be able to detect the magnetism from the magnet throughout a stroke of the spool and every operating position of the spool can be detected from a change in magnetic flux density due to movement of the magnet.

10. A selector valve according to claim 8, wherein the driving means is a solenoid-operated pilot valve, the spool is switched by one or two pilot valve(s), every pilot valve is mounted to one of the end blocks, and the magnet and the magnetometric sensor are provided on a side of the end plate to which the pilot valve(s) is(are) not mounted.

11. A selector valve according to claim 8, wherein the driving means is a solenoid-operated pilot valve, the spool is switched by a pilot valve, the pilot valve is mounted to one of the end blocks, and the magnet and the magnetometric sensor are provided on a side of the end plate to which the pilot valve is not mounted.

12. A selector valve, comprising:

a casing having a plurality of ports and a valve hole into which the ports open;

a spool housed to slide in the valve hole and having one end extending outside from the valve hole to switch flow paths;

end blocks configured to house a piston on opposite sides of the casing;

driving means for driving the spool;

a magnet mounted to a portion of the one end of the spool extending from the valve hole to move with the spool outside the valve hole;

a detecting block disposed between one end of the casing and one of the end blocks to surround the one end of the spool extending from the valve hole and the magnet mounted to the portion of the one end of the spool extending from the valve hole; and a magnetometric sensor mounted to the detecting block configured to detect magnetism from the magnet.

13. A selector valve according to claim 12, wherein the detecting block comprises a first portion disposed between the casing and the end block to surround an area where the magnet moves and a second portion positioned along an outer face of the selector valve astride the first portion and the end block, a sensor mounting groove is formed in the second portion in parallel with an axis of the spool and astride the moving area of the magnet, and the magnetometric sensor is fitted in the sensor mounting groove.

14. A selector valve according to claim 13, wherein the magnetometric sensor is mounted in the sensor mounting groove to be able to detect the magnetism from the magnet throughout a stroke of the spool and operating positions of the spool can be detected from a change in magnetic flux density due to movement of the magnet.

15. A selector valve according to claim 12, wherein the driving means is a solenoid-operated pilot valve, the spool is switched by a pilot valve, every pilot valve is mounted to one of the end blocks, and the magnet and the magnetometric sensor are provided on a side of the end blocks to which the pilot valve is not mounted.

16. A selector valve according to claim 12, wherein the driving means is a solenoid-operated pilot valve, the spool is switched by one or two pilot valve(s), every pilot valve is mounted to one of the end blocks, and the magnet and the magnetometric sensor are provided on a side of the end blocks to which the pilot valve(s) is(are) not mounted.

17. A selector valve according to claim 13, wherein the driving means is a solenoid-operated pilot valve, the spool is switched by a pilot valve, every pilot valve is mounted to one of the end blocks, and the magnet and the magnetometric sensor are provided on a side of the end plate to which the pilot valve is not mounted.

18. A selector valve according to claim 13, wherein the driving means is a solenoid-operated pilot valve, the spool is switched by one or two pilot valve(s), every pilot valve is mounted to one of the end blocks, and the magnet and the magnetometric sensor are provided on a side of the end plate to which the pilot valve(s) is(are) not mounted.

* * * * *